Patented June 4, 1940

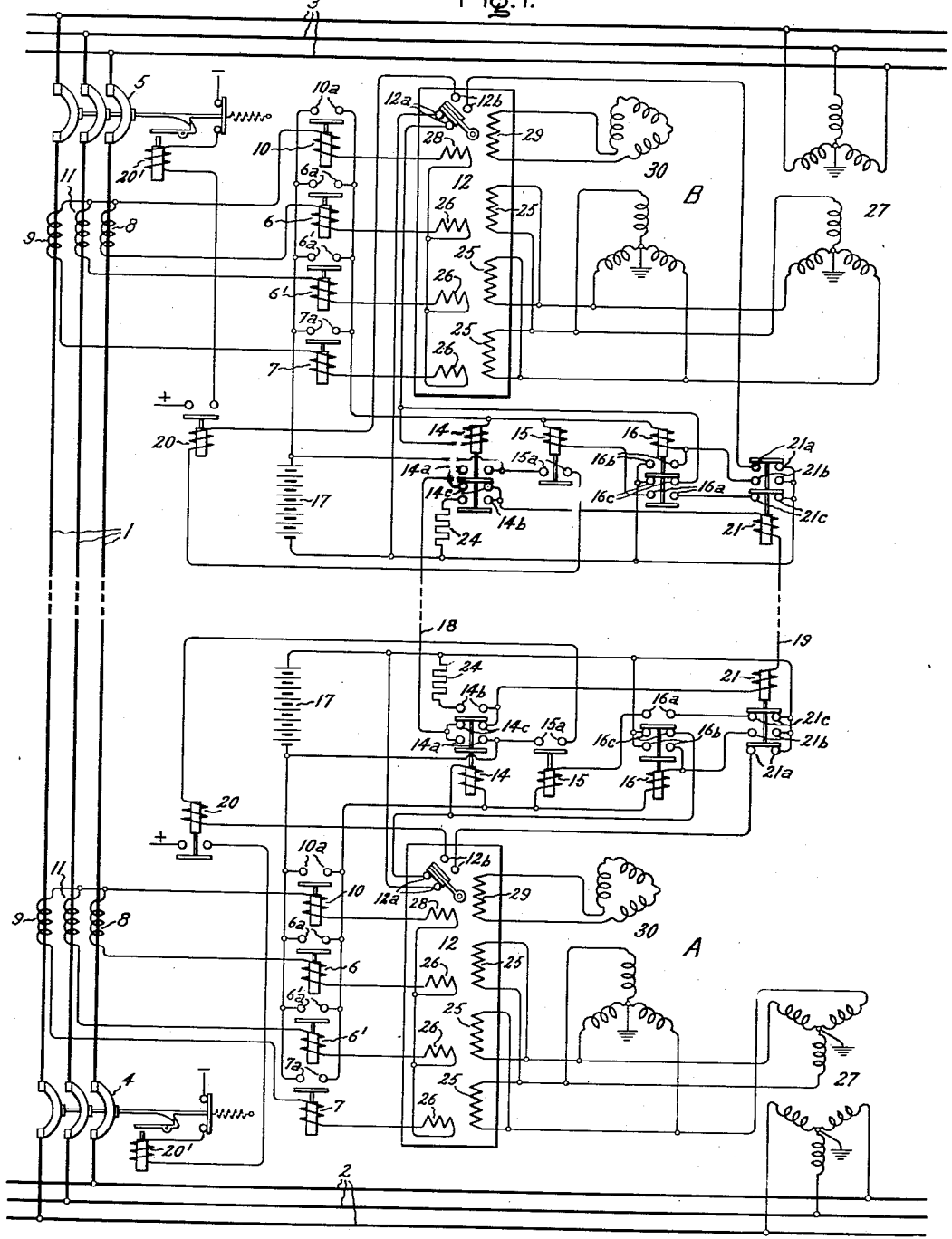

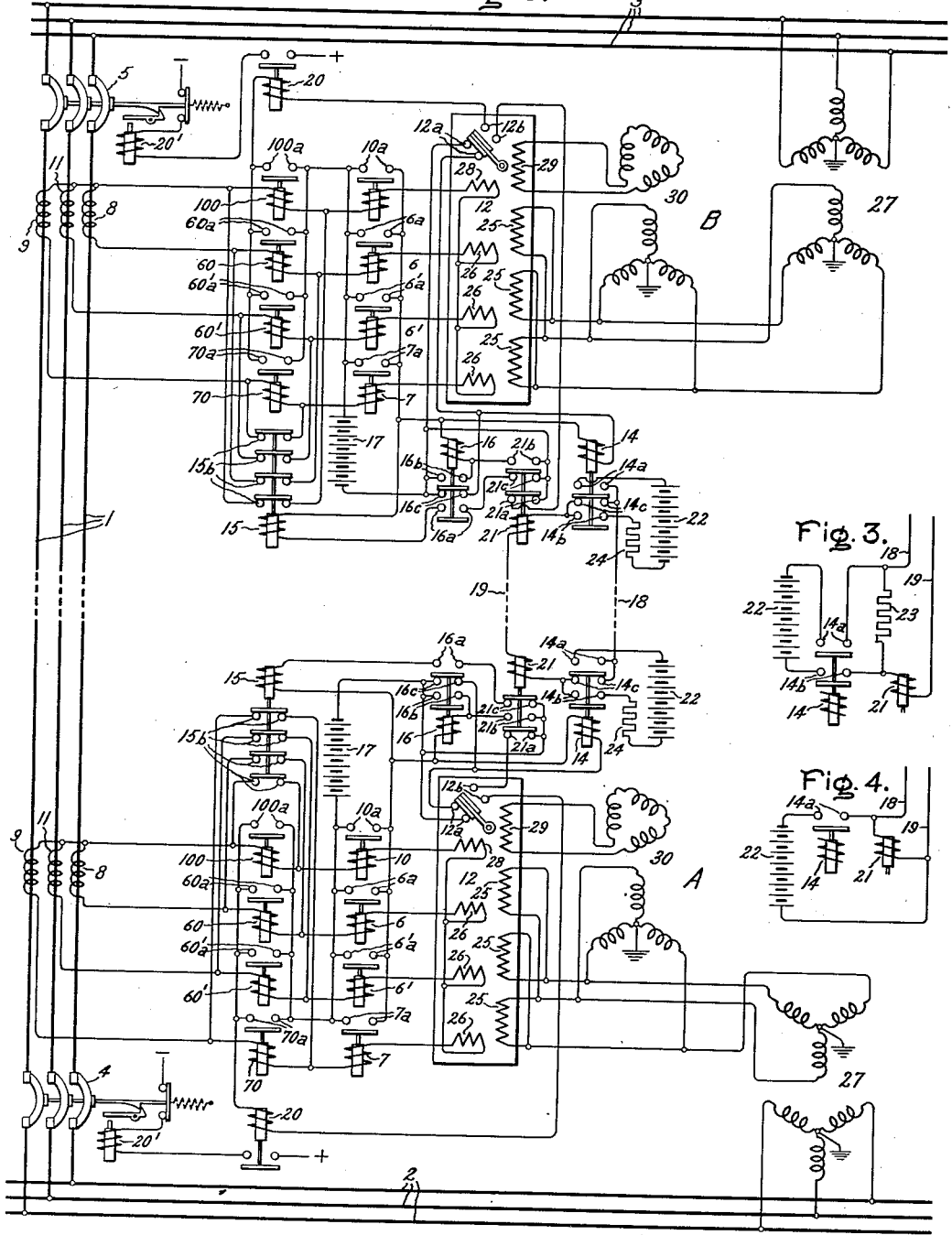

2,203,548

UNITED STATES PATENT OFFICE 2,203,548

PROTECTIVE ARRANGEMENT

Clifford Ryder, Manchester, England, assignor to General Electric Company, a corporation of New York Application October 4, 1938, Serial No. 233,281
In Great Britain October 13, 1937

10 Claims. (Cl. 175—294)

My invention relates to improvements in protective arrangements for feeders, sections and the like in electrical power systems, and particularly to protective arrangements of the kind in which circuit breakers at the ends of the feeder or section or the like, hereinafter for convenience referred to simply as the feeder, are arranged to be tripped upon the occurrence of a fault on the feeder by means of relay means responsive to the flow of fault current and in which directional relay means responsive to the direction of power flow at the respective ends of the feeder in association with a channel of intercommunication between the two ends, constituted, for instance, by, and hereinafter referred to as, a pilot circuit, determine the opening of the circuit breaker according as the fault is indicated to be within or without the protected section. With such arrangements as heretofore employed, and particularly in the case of protective arrangements for providing high speed operation, in which a relay tending to effect tripping at one end is prevented from doing so in the case of a through fault by energization of the pilot circuit, difficulties arise in avoiding mutual acceleration or "racing" between the operation of the relays for tripping the circuit breaker at each end of the feeder and the relays for preventing tripping under through fault conditions, so that the energization of the pilot circuit to prevent opening of the circuit breakers may not be effective at an end of the feeder into which power is flowing until after the relay means by which the fault is detected have caused the circuit breaker at that end of the feeder to be tripped. With a view to overcoming these objections the various relays may be provided with graded time delays in their operation but the speed of response of the protective system is then reduced and the correct operation is dependent upon maintenance of the grading of the relays.

According to my invention, however, in a protective arrangement of the kind set forth, relay means for causing tripping of the circuit breakers at each end of the feeder in response to flow of fault current in the latter are arranged to be conditioned to cause such tripping upon a modification in the condition of energization of the pilot circuit in response to said flow of fault current, but are rendered effective to cause such tripping only upon a further modification of said condition of energization of the pilot circuit effected under control of the relay means responsive to the direction of flow of power at the ends of the feeder. The modifications referred to in the condition of energization of the pilot circuit may be either of degree or of kind, or modifications of both degree and of kind may be utilized as may be desired. Where modifications of degree of energization are employed, the further modification may, as will be appreciated, be in the opposite or the same sense as the first modification, namely that effected in response to the flow of fault current in the feeder.

According to another aspect, my invention provides, in a protective arrangement of the kind set forth, relay means for causing tripping of the circuit breakers at each end of the feeder in response to flow of fault current in the latter, arranged so as to be rendered effective to trip the circuit breakers only upon reinstatement of the energization of the pilot circuit to its original or a similar condition by the relay means responsive to the direction of flow of power at the ends of the feeder, following upon a change initiated in the condition of energization of said pilot circuit in response to said flow of fault current.

According to a further feature of my invention, at each end of the feeder a holding-in relay means is arranged to be operated and to hold itself so operated upon change in the condition of energization of the pilot circuit effected in response to the flow of fault current in the feeder, and tripping means for the circuit breaker at each end of the feeder are arranged to be operated in dependence upon the associated holding-in relay means having operated and held itself operated, when the further change in the condition of energization of the pilot circuit is effected by the directional relay means as a result of power flowing to a fault in the feeder.

More specifically, my invention provides a protective arrangement for a feeder, or the like, comprising relay means responsive to the flow of fault current at the associated end of the feeder, arranged to change the state of energization of a pilot circuit and thereby to cause operation of holding-in relay means which, when so operated, condition relay means for tripping the circuit breaker at respective ends of the feeder, together with relay means rendered effective by operation of said holding-in relay means to allow said tripping relay means to trip the circuit breaker upon return of the condition of energization of the pilot circuit to the original or a similar condition, and directional relay means arranged so as to cause return of the energization of the pilot circuit to its original or a similar condition only when the flow of power is into the feeder at the two ends thereof.

It will be seen that with the arrangements embodying my invention the tripping of the circuit breakers is precluded until the pilot circuit has been subjected to a change in its condition of energization and is then permitted only if the energization of the pilot circuit is further changed or is returned to its original or a similar condition consequent on power flowing into the feeder from both ends thereof. The arrangement thus insures that tripping of the circuit breakers shall not occur during the brief interval required for the change in the energization of the pilot circuit to become effective at both ends of the feeder if the fault is a through fault.

In carrying out my invention the pilot circuit and relay means may conveniently be arranged so that the pilot circuit is either normally deenergized or normally energized. If the pilot circuit is normally deenergized then the fault current relay means may be arranged to cause energization of the pilot circuit upon the occurrence of a fault on the system and the tripping of the circuit breakers is prevented until the pilot circuit has been again deenergized in consequence of operation of the directional relay means at both ends of the feeder. Alternatively, where the pilot circuit is normally energized then the relay means may be arranged to operate in an inverse manner to that just above indicated so that tripping of the circuit breakers is prevented unless the pilot circuit is first deenergized and then reenergized. The former arrangement is in general preferable since it is usually considered desirable in the art that pilot circuits shall not be continuously energized with protective circuit current.

It is generally desired with protective arrangements of the kind referred to that a failure of the arrangement shall not cause tripping of the circuit breakers unnecessarily rather than that such a failure shall cause opening of the circuit breaker on occasions when the circuit breaker should not be opened, since with the latter arrangement there is a greater liability to interruptions of the supply of power. With this consideration in view, relay means for responding to the change in the condition of energization of the pilot circuit consequent upon flow of fault current in the feeder may be arranged so to respond only if the pilot circuit is intact from end to end of the feeder, so that unless the pilot circuit is intact from end to end of the feeder such relays will not be operated and the sequence of operation in the protective arrangement cannot proceed to allow tripping of the circuit breaker if the pilot circuit becomes discontinued. For this purpose the operating coils of the relay means just above referred to may conveniently be included in series in one or more wires of the pilot circuit. With arrangements such as just above indicated temporary rendering of the pilot circuit out of commission can at the worst only result in failure of the protective arrangement to open the associated circuit breaker instead of giving rise to the possibility of undesired opening of the circuit breaker.

In other arrangements applicable in cases where it is desired that tripping of the circuit breakers shall not be prevented, if the pilot circuit becomes out of commission, relay means for responding to the change in the condition of energization upon flow of fault current in the feeder may be arranged so to respond, when the apparatus at the associated end of the arrangement operates to energize the pilot circuit that, upon flow of fault current in the feeder, said relay will operate and tripping of the associated circuit breaker will ensue both upon the further change in the condition of energization of the pilot circuit effected by the directional relays when the fault is on the feeder and also at that end of the feeder at which power flows into the feeder if the pilot circuit becomes out of commission during the flow of fault current in the feeder. For this purpose the operating coils of the relay means just above referred to may conveniently be connected in parallel with the pilot wires at the respective ends of the pilot circuit.

According to a further feature of my invention, two sets of fault current detecting relay means are provided at each end of the feeder, one of said sets of relay means having contacts controlling the circuit of tripping means for the associated circuit breaker, together with means for rendering said set normally ineffective, but effective when operation of the other set of fault detecting relay means has resulted in the second change in the condition of energization of the pilot circuit, namely due to the operation of the relay means responsive to the direction of flow of power at the end of the feeder when the fault is on the feeder. This first resultant set of relays will normally be set to operate at higher values of fault current than the other set, and, it will be seen, are rendered effective only when fault current is flowing to a fault on the feeder. The first-mentioned set of fault detecting relays may conveniently be controlled by the contacts of relay means responding to the operation of holding-in relay means, as hereinbefore referred to, consequent upon the first change in the condition of energization of the pilot circuit in addition to being controlled by contacts of relay means responding to the second change in the condition of energization of the pilot circuit.

My invention will be better understood from the following description when considered in connection with the accompanying two sheets of drawings, and its scope will be pointed out in the appended claims.

In the accompanying drawings, Fig. 1 illustrates diagrammatically a protective arrangement embodying my invention; Fig. 2 illustrates diagrammatically a modification of the embodiment of my invention shown in Fig. 1; and Figs. 3 and 4 illustrate diagrammatically other modifications of the embodiment of my invention shown in Figs. 1 and 2.

Referring now to Fig. 1, a feeder 1 is illustrated as serving to interconnect two stations shown schematically by busbars 2 and 3 respectively. Circuit breakers 4 and 5 are provided for controlling the connection of the lower and upper ends of the feeder 1 with the busbars 2 and 3 respectively. The feeder and busbars are shown as of a three-phase alternating current system, but as will be appreciated the invention is not limited to three-phase or to alternating current systems.

The protective gear comprises two similar sets of relays which are associated respectively with the two ends of the feeder and are indicated generally at A and B respectively in Fig. 1. The protective gear comprises, at each end of the feeder, phase fault detectors such as overcurrent relays 6, 6' and 7, whose operating coils are connected to the secondary windings of current transformers 8, 11 and 9 respectively so that the relays 6, 6' and 7 are responsive to phase-to-phase faults on the feeder 1, and a ground fault detector such as an overcurrent relay 10, the operating coil of which is connected on the one hand to the star-point of the secondary windings of the transformers 8, 11, and 9 so that the relay 10 is responsive to earth faults on the feeder 1. Any other suitable fault detectors may be used, for example relays of the distance type. In addition the protective gear comprises in each set of relays A and B a directional relay indicated generally at 12 having windings connected in circuit with the current transformers 8, 9 and 11 in the manner shown and arranged so as to be responsive to the direction of flow of phase fault and ground fault power flow at the associated end of the feeder. Any suitable power directional relays, examples of which are well known to the art, may be used. I have chosen to illustrate a combination phase and ground power directional relay 12 with its phase voltage windings 25 and phase current windings 26 in the so-called quadrature connection, the voltage windings 25 being energized from a potential transformer 27 connected to the station bus. As shown, the ground power element has a current winding 28 connected in the residual circuit of the curernt transformers 8, 9, 11 and a voltage winding 29 in the open corner of the delta winding of the potential transformer 30.

The fault detectors 6, 6', 7, and 10 at each end of the feeder are provided with respective parallel connected circuit closing contacts 6a, 6'a, 7a, and 10a which at each end of the feeder are connected in circuit with the operating coils of three auxiliary relays 14, 15 and 16, so as to control the energization of the latter from a suitable auxiliary source of electrical energy represented in the drawings by a storage battery 17. The relay 14, which is hereinafter referred to as the pilot governing relay, is provided with normally open contacts 14a and 14b which when closed cause energization of the control or pilot circuit, which includes the conductors 18 and 19, from the adjacent battery 17.

The relay 15, hereinafter termed the auxiliary relay is provided with normally open contacts 15a which are included in series with the battery 17 and the operating coil of a tripping relay 20 which when energized completes the circuit of the associated circuit breaker trip coil 20' so as to release the latch thereof, as schematically illustrated in the drawings.

The relay 16, hereinafter termed the holding-in or seal-in relay is provided with normally open contacts 16a included in circuit with the coil of the auxiliary relay 15 and is further provided with holding-in contacts 16b connected across the contacts 21b of a relay 21, which is hereinafter termed the pilot relay, and which has its coil included in the conductor 19 of the pilot circuit. The pilot relay 21 also has normally closed contacts 21c included in the circuit of the coil of the auxiliary relay 15.

The circuit of the pilot governing relay 14 is completed through normally closed or back contacts 16c of the holding-in relay 16 and the contacts 16c are shunted by contacts 12a which are closed by the directional relay 12 when power flows out of the feeder at the associated end of the latter. Thus, the contacts 12a of the arrangement A are closed when power flows from the feeder 1 at the lower end thereof towards the busbars 2, and the contacts 12a of the arrangement B are closed when power flows from the feeder 1 at the upper end thereof towards the busbars 3. The directional relay 12 in each arrangement also carries contacts 12b which are closed when power flows into the feeder from the associated end, namely in the opposite directions to those just above set forth. The contacts 12b are included in series with the coil of the tripping relay 20 and the circuit of this coil is controlled also by normally closed contacts 21a of the associated pilot relay.

The pilot governing relay 14 is also provided with normally closed contacts 14c which as shown are connected across the conductors 18 and 19 at each end of the pilot circuit.

Suitable current limiting means, such as resistances 24, may be included in the pilot circuit so that, independently of the length thereof, it may be possible to use the same relays, the same voltages and also to prevent possible short circuits in constructions of the relay 14 which might not effect interruption at the contacts 14a and 14b before closure of the contacts 14c.

With the arrangement shown in Fig. 1, assuming that a fault occurs on the feeder 1 and that each bus can supply power, then power flows into both ends of the feeder and the operation of the various relays in each of the arrangements A and B will be as follows: First one or more of the phase-to-phase fault detecting relays 6, 6' and 7 or the earth fault detecting relay 10 will close some one or more of the contacts 6a, 6'a, 7a, and 10a and the directional relay 12 will open its contacts 12a in circuit with the coil of the associated pilot governing relay 14 and will close its contacts 12b in circuit with the coil of the associated tripping relay 20. The circuit of the coil of the relay 14 is consequently completed through the back contacts 16c of the associated holding-in relay 16 with the result that the pilot governing relay 14 closes its contacts 14a and 14b and opens its contacts 14c thereby to energize the pilot circuit 18 and 19 from the storage battery 17. It will be observed that when the contacts 14a and 14b close the storage batteries 17 in the two arrangements A and B are connected with opposite polarities to the pilot wires 18 and 19 so as to act in the same direction in the pilot circuit. The pilot relay 21 at each end of the section is thus energized provided the pilot circuit is continuous and the contacts 21b are then closed. The circuit of the holding-in relay coil 16 is thus completed and said relay picks up and closes its holding-in contacts 16b thereby to hold itself in the operated position.

The operation of the holding-in relay 16 causes, due to the opening of its back contacts 16c, the deenergization of the associated pilot governing relay 14, the contacts 12a having been opened by the directional relay 12, with the result that the relay 14 opens its contacts 14a and 14b and closes its contacts 14c so that the pilot circuit 18, 19 is deenergized at the associated end of the section. Under the conditions being considered, namely when the fault current is flowing to a fault on the section from both ends thereof and since the operation as above described is consequently obtained in the arrangements A and B at both ends of the section, the pilot circuit 18, 19 is thus deenergized at both ends. In consequence of the deenergization of the pilot circuit the pilot relays 21 at both ends of the section are deenergized and close their respective back contacts 21c thereby respectively to complete the circuits of the coils of the associated auxiliary relays 15, the contacts 16a of the holding-in relays being at this time closed and the auxiliary relays thereupon close their contacts 15a and so cause energization of the associated tripping relays 20 through the contacts 12b of the associated directional relays and the back contacts 21a of the associated pilot relays, these contacts 12b and 21a being at this time closed. The circuit breaker at each end of the section is thus tripped by the associated tripping relay 20.

In the event of power being supplied to a fault on the feeder from one end only, the pilot governing relay 14 at that end only will be energized, but both the pilot relays 21 would respond, the pilot circuit being maintained through the back contacts 14c of the pilot governing relay at the other end of the feeder. The relay 14 at said end of the feeder at which power flows thereinto will subsequently be deenergized as hereinbefore described by the operation of the contacts 12a of the directional relay 12 at that end and the pilot circuit will thus be deenergized and the circuit breaker through which the power flows will be tripped due to closure of the contacts 12b of the directional relay at that end of the feeder.

Assuming now the occurrence of a fault on another part of the system, namely the existence of through fault conditions on the feeder 1, then at each end of the section the appropriate fault detecting relays 6, 6', 7, or 10 will close their contacts with the result that the pilot governing relay 14 is energized. The operation of this relay causes energization of the pilot circuit and the pilot relays 21 at both ends of the feeder by closure of the contacts 14a and 14b and opening of the contacts 14c. The holding-in relay 16 at each end of the section is thus again energized and holds itself in the operated position. The pilot governing relay 14 associated with that end of the section into which power flows is then deenergized by the same sequence of relay operation as above described for fault conditions on the feeder, since the directional relay 12 at the end of the feeder at which power flows into the latter will be operated in the same manner as above described. Since, however, the directional relay 12 at that end of the feeder at which the power flows out of the feeder into the adjacent busbars 2 or 3 maintains closed its contacts 12a in circuit with the pilot governing relay 14 at said end of the section, the relay 14 at this end is maintained in the operated position irrespectively of the opening of the back contacts 16c of the holding-in relay associated with the second end of the section. The contacts of the pilot governing relay 14a and 14b are thus maintained closed and the contacts 14c maintained open by the pilot governing relay at this end of the section, and since the back contacts 14c have been closed at the first mentioned end of the section, namely that at which the power flows into the feeder the energization of the pilot circuit is consequently maintained from the second mentioned end of the section with the result that both of the pilot relays 21 remain in the operated position and tripping of the circuit breakers 4 and 5 at both ends of the feeder 1 is prevented since the circuits of the associated tripping relays 20 are interrupted at the back contact 21a of the pilot relays at the two ends of the feeder.

Upon clearing of the fault being considered, namely a fault on another part of the system, the relays 6, 6', 7 and 10 open their contacts and the relay 14 is deenergized whereby the pilot circuit is returned to its normally deenergized state and the holding-in relay 16 is deenergized together with that auxiliary relay 15 which has been energized so that the deenergization of the pilot circuit under these conditions leaves the tripping relays 20 unoperated.

From the above description it will be seen that operation of any one of the fault detecting relays 6, 6', 7, 10 results in energization of the pilot circuit. Such energization causes operation of the holding-in relay 16, so that, assuming the holding-in relay 16 remains operated, the coil of the tripping relay 20 may be energized when the associated pilot relay 21 recloses its back contacts 21a upon the subsequent deenergization of the pilot circuit by the dropping out of the relays 14 which were energized. The deenergization of the pilot circuit can however only be effected at each end of the feeder if the associated directional relay 12 has opened its contacts 12a so as to allow the energization of the pilot governing relay 14 to be terminated when the contacts 16c of the holding-in relay open, but these contacts 16c can only open after the pilot circuit has been energized since the operation of the holding-in relays 16 is caused by the energization of the pilot circuit. The circuit breakers are thus not tripped until after the pilot circuit has been deenergized at both ends thereof, which condition is obtained only when power flows into the feeder at both ends thereof, namely when the fault current is flowing to a fault in the feeder.

It is to be noted that in the arrangement shown in Fig. 1, due to the inclusion of the operating coils of the pilot relays 21 in series in the pilot circuit 18, 19, these relays can only be energized to close their contacts 21b included in circuit with the holding-in relays when the pilot circuit is intact and consequently the sequence of relay operation cannot proceed to cause tripping of the circuit breakers 4 and 5 unless the pilot circuit is intact. The arrangement of the back contacts 14c by which the ends of the pilot circuit are connected together at the ends of the feeder insures that the energization of the pilot circuit and thereby the pilot relays 21 shall be maintained under through fault conditions irrespectively of the opening of contacts 14a and 14b at that end of the section at which power flows into the feeder.

As will be appreciated although in the arrangement of Fig. 1 the pilot circuit is shown as being energized at each end of the feeder from the same source of current, shown as the battery 17, by which the relays 14, 15, 16 and 20 are energized the pilot circuit may if desired be provided with a separate source of current at each end of the feeder. This arrangement is shown in Fig. 2 which illustrates a modification of the arrangement of Fig. 1. Thus, in Fig. 2 there is provided in each of the arrangements A and B a second source of current 22 again illustrated as a storage battery. The arrangement of the relays is generally similar to those in Fig. 1, but the contacts 15a of Fig. 1 are replaced by the contacts of a further set of phase-to-phase fault detecting relays 60, 60' and 70 and an each fault detecting relay 100, the operating coils of which are included in series with the operating coils of the first set of fault detecting relays. The second set of fault detecting relays are set to operate at higher values of fault current than the fault detecting relays 6, 6', 7 and 10. The fault detectors 60, 60', 70 and 100 may be any suitable type, for example distance relays. The contacts of the second set of detecting relays are connected in parallel with one another as indicated at 60a, 60'a, 70a, and 100a and included in circuit with the coil of the tripping relay 20 in each arrangement.

The operating coils of the second fault detecting relays are shunted by contacts 15b carried by the auxiliary relay 15 of the associated arrangement. These contacts are normally closed but are opened when the auxiliary relay energized.

The operation of the arrangement shown in Fig. 2 is generally similar to that of Fig. 1 except that the energization of the tripping relay 20 at the end of the sequence of relay operations instead of being controlled by the closure of contacts 15a of Fig. 1 due to deenergization of the auxiliary relay 15 upon deenergization of the pilot relays 21 is effected by one or more of the fault detecting relays 60, 60', 70 and 100 closing their corresponding contacts and energizing the tripping relay 20, the fault detecting relay or relays being brought into operation by opening of the back contacts 15b of the auxiliary relay when the latter is energized. The second set of fault detecting relays 60, 60', 70, 100 is thus brought into operation only after the first set of fault detecting relays 6, 6', 7, 10 has responded to a fault, the second set of detecting relays remaining ineffective during through fault conditions on the feeder 1 since under these conditions the auxiliary relay 15 is not energized, in consequence of the pilot relay 21 remaining energized.

Fig. 3 shows a modification which may be effected in the arrangement of the pilot circuit. According to Fig. 3 in place of the back contacts 14c of the pilot governing relays shown in Figs. 1 and 2 a resistance 23 is connected across each end of the pilot circuit, it being appreciated that Fig. 3 shows only the arrangement of one end of the pilot circuit. It will be seen that the resistance 23 performs the same function as the back contacts 14c of Figs. 1 and 2 in maintaining the continuity of the pilot circuit at the associated end of the latter irrespectively of the opening of the contacts 14a and 14b at that end of the pilot circuit so that both of the pilot relays 21 may be energized over the pilot circuit from a single end of the latter as is required during through fault conditions. However, when fault current flows into or through the feeder 1 any discontinuity in the pilot wires 18, 19 will not result in tripping of the circuit breakers 4 or 5 since these circuit breakers will both be maintained closed even though the fault is on the feeder.

As hereinbefore set forth such operation is generally preferred. Where, however, it is desired that discontinuity of the pilot circuit shall, in the event of fault current flowing through the feeder 1, result in tripping of the circuit breakers rather than that said discontinuity shall inhibit tripping under fault conditions in the feeder, the pilot relays 21 may be arranged so that the protective arrangement at that end of the feeder into which the fault current is flowing will operate to deenergize the associated pilot relay 21 if the pilot circuit becomes discontinuous under fault conditions, that is to say the pilot relay is arranged so that it may be energized from the associated end of the pilot circuit alone if the pilot circuit becomes discontinuous.

One arrangement as just above indicated is shown by way of example in Fig. 4 which again shows only the arrangement at one end of the pilot circuit. In this arrangement the coil of the pilot relay 21 is connected in parallel with the pilot wires 18 and 19 at the adjacent ends of the latter, and the two batteries 22 will have their similar poles connected respectively with the pilot wires 18 and 19. It will be seen that with this arrangement when the pilot governing relay 14 closes its contacts, shown in Fig. 4 as a single set 14a only, the pilot relay 21 and the pilot wires 18 and 19 are energized so that normally the pilot relay 21 at each end of the feeder will be energized by operation of the pilot governing relay at either end of the feeder. If the circuit through the pilot wires 18 and 19 becomes discontinuous the pilot relay 21 at both ends of the feeder will be energized from the associated batteries 22 respectively and the pilot relay 21 at that end of the feeder at which power flows into the feeder will subsequently be deenergized by the operation of the back contacts 16c of the holding-in relay at that end of the feeder and the associated circuit breaker will be tripped.

In Figs. 2, 3 and 4 a separate source 22 is shown for the pilot circuit, but as will be appreciated if desired the same source of current as employed for the operation of the other relays, namely the source 17 in Figs. 1 and 2, may be employed also for energization of the pilot circuit similarly to the arrangement employed in Fig. 1.

It will be understood that where reference has been made herein to a pilot circuit the latter may be replaced by any other suitable channel of intercommunication between the protective arrangement at the two ends of the feeder, and the appended claims are to be interpreted accordingly.

As will be appreciated although in the embodiments of the invention hereinbefore described, the modifications utilized in the condition of energization of the pilot circuit are modifications of the degree of energization and the further modification in the condition of energization comprises returning said energization to the original condition, such further modification may if desired be such as to return the energization to a degree intermediate the original condition and that resulting after the first modification, namely that effected upon flow of fault current in the feeder. Alternatively, the further modification may be in the same sense as the first modification or as hereinbefore indicated one or both of the modifications may be modifications of kind of energization of the pilot circuit and it is to be understood that all such arrangements are included within the scope of the invention.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. A protective arrangement for an electric power system including circuit interrupter means, means for effecting the opening of said circuit interrupter means, a control circuit for said circuit interrupter opening means, and means for controlling said control circuit to prevent the operation of said circuit interrupter opening means until after two changes in the condition of energization of the control circuit comprising means for effecting both of said changes in dependence on the location of a fault on the system.

2. A protective arrangement for an electric power system including circuit interrupter means, means for effecting the opening of said circuit interrupter means, a control circuit for said circuit interrupter opening means, means for controlling said control circuit to prevent the operation of said circuit interrupter opening means until after two changes in the condition of energization of the control circuit, and fault responsive means for effecting both of said changes only when the fault occurs in a predetermined part of the system.

3. In a protective arrangement for a section of an electric power system, a circuit interrupter at one end of the section, means for transmitting a control current between the ends of said section, means for effecting the opening of said circuit interrupter, means for controlling said circuit interrupter opening means and the transmission of said control current on the occurrence of a fault on the system to prevent the operation of said circuit interrupter opening means until after a change in the condition of transmission of the control current, and means for subsequently rendering said circuit interrupter opening means effective to open said circuit interrupting means only upon a further change in the condition of transmission of the control current when the fault is within the section.

4. In a protective arrangement for a section of an electric power system, circuit interrupting means at one end of the section, a circuit for transmitting a control current between the ends of said section, tripping means for effecting the opening of said circuit interrupting means, means for controlling said tripping means and said control circuit on the occurrence of a fault on the system to prevent the tripping operation of said tripping means until after a change in the condition of energization of the control circuit including means responsive to faults on the system for effecting such change, and means for subsequently rendering said tripping means effective to open said circuit interrupting means only upon a further change of condition of energization of the control circuit when the fault is within the section including means responsive to the direction of flow of fault power at the ends of said section for effecting such further change.

5. In a protective arrangement for a section of an electric power system, a circuit interrupter at one end of the section, a circuit for transmitting a control current between the ends of said section, means for effecting the opening of said circuit interrupter, means for controlling said circuit interrupter opening means and said control circuit on the occurrence of a fault on the system to prevent the operation of said circuit interrupter opening means until after a change in the condition of energization of the control circuit, and means for subsequently rendering said circuit interrupter opening means effective to open said circuit interrupter only upon restoration of the energization of the control circuit to its initial condition when the fault is within the section.

6. In a protective arrangement for a section of an electric power system, circuit interrupting means at each end of the section, means for establishing a flow of control current between said section ends on the occurrence of a fault on the system, tripping means for effecting an opening operation of said circuit interrupting means, means for preventing the tripping operation of said tripping means on the occurrence of a fault on the system until after the flow of said control current has been established, means responsive to the flow of said control current for subsequently rendering said tripping means effective to open said circuit interrupting means upon cessation of flow of said control current when the fault is within the section.

7. In a protective arrangement for a section of an electric power system, circuit interrupting means at one end of the section, a circuit for transmitting a control current between the ends of said section, tripping means for effecting the opening of said circuit interrupting means, means for controlling said tripping means and said control circuit on the occurrence of a fault on the system to prevent the tripping operation of said tripping means until after a change in the condition of energization of the control circuit including means responsive to faults on the system for effecting such change, and means for subsequently rendering said tripping means effective to open said circuit interrupting means only upon restoration of the energization of the control circuit to its initial condition when the fault is within the section including means responsive to the direction of flow of fault power at the ends of the sections.

8. In a protective arrangement for a section of an electric power system, circuit interrupting means at each end of the section, means for establishing a flow of control current between said section ends on the occurrence of a fault on the system, tripping means for effecting the operation of said circuit interrupting means, means for preventing the tripping operation of said tripping means until after the flow of said control current has been established including holding-in relay means operative in response to the flow of said control current, means responsive to the operation of said holding-in relay means for stopping the flow of said control current when the fault is on the section including power directional relay means connected to be energized from the system, and means for rendering said tripping means effective to open said circuit interrupting means including means responsive to the operation of said holding-in relay means and the cessation of flow of said control current and said power directional means.

9. In a protective arrangement for a section of an electric power system, circuit interrupting means at one end of the section, a circuit for transmitting a control current between the ends of said section, tripping means for effecting the opening of said circuit interrupting means, means for controlling said tripping means and said control circuit on the occurrence of a fault on the system to prevent the tripping operation of said tripping means until after a change in the condition of energization of the control circuit including means responsive to faults on the system for effecting such change and holding-in relay means connected to be operated in response to the change in condition of the control circuit energization, and means for subsequently rendering said tripping means effective to open said circuit interrupting means only upon a further change in the condition of energization of the control circuit when the fault is within the section including said holding-in relay means and means responsive to the direction of flow of fault power at the ends of said section for effecting such further change.

10. In a protective arrangement for a section of an electric power system, circuit interrupting means at one end of the section, a normally de-energized control circuit extending between the ends of said section, tripping means for effecting the opening of said circuit interrupting means, means for controlling said tripping means and said control circuit on the occurrence of a fault on the system to prevent the tripping operation of said tripping means until after the energization of the control circuit including means responsive to faults on the system for effecting such energization and holding-in relay means connected to be operated in response to the energization of the control circuit, and means for subsequently rendering said tripping means effective to open said circuit interrupting means only upon deenergization of the control circuit when the fault is within the section including said holding-in relay means and means responsive to the direction of flow of fault power at the ends of said section for effecting such deenergization.

CLIFFORD RYDER.